Sept. 29, 1942.  R. G. LE TOURNEAU  2,296,859
TRACTOR FRAME
Filed Aug. 24, 1940  3 Sheets-Sheet 1

INVENTOR
R. G. Le Tourneau
BY
ATTORNEYS

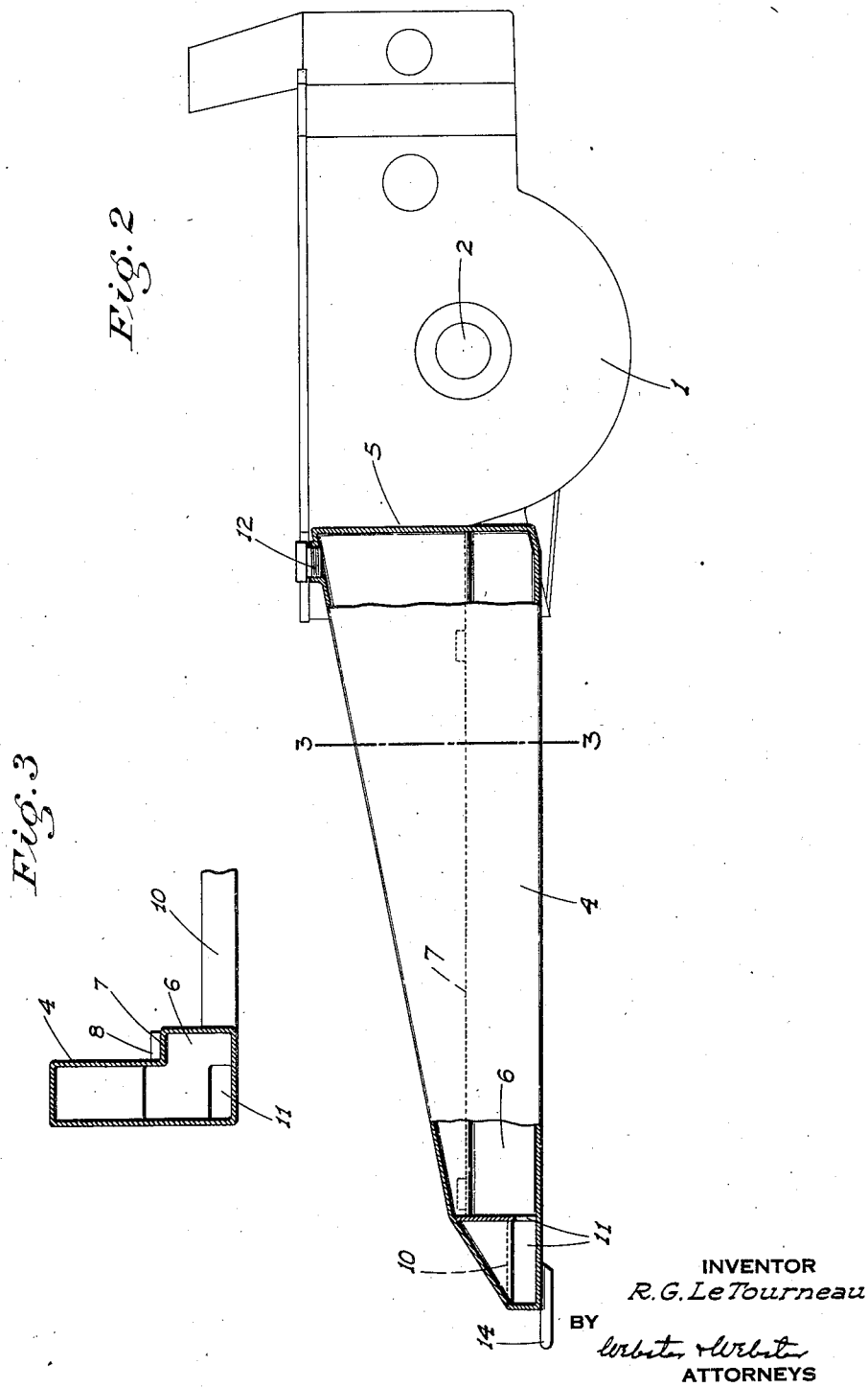

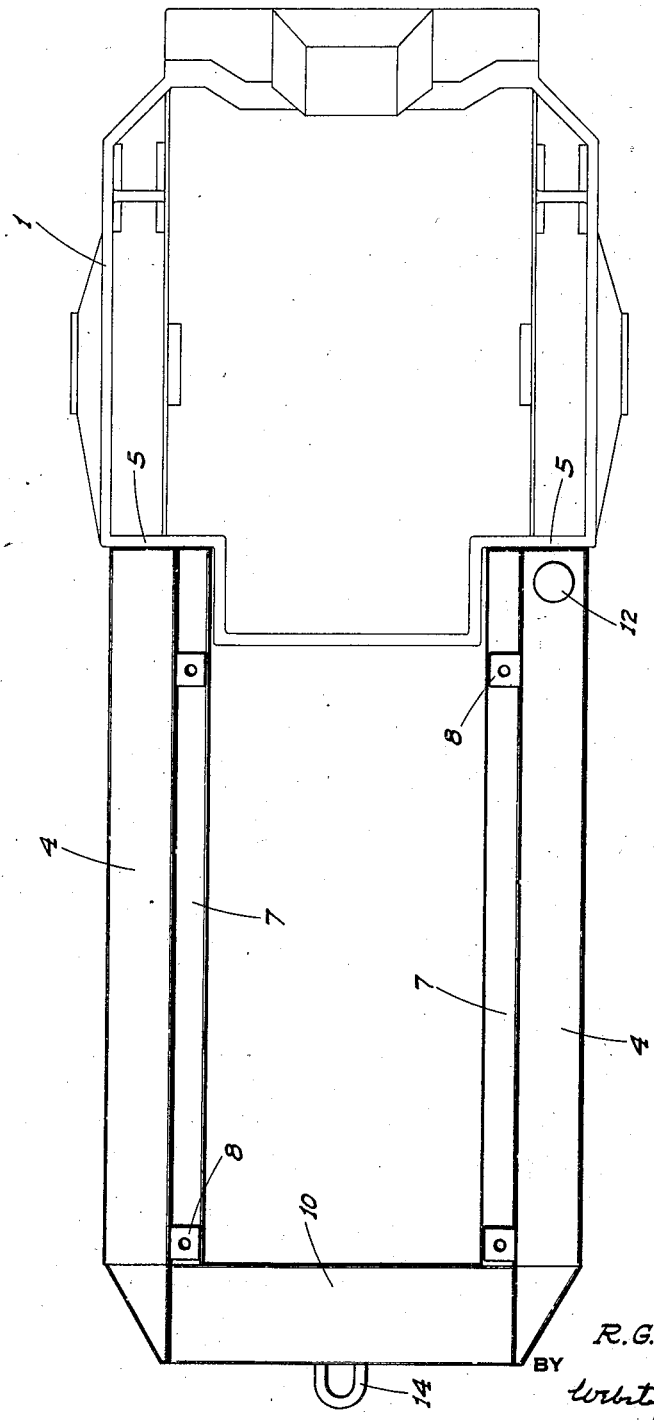

Patented Sept. 29, 1942

2,296,859

UNITED STATES PATENT OFFICE 2,296,859

TRACTOR FRAME

Robert G. Le Tourneau, Peoria, Ill., assignor to R. G. Le Tourneau, Inc., a corporation of California Application August 24, 1940, Serial No. 354,001

5 Claims. (Cl. 280—5)

This invention relates to tractors and particularly to a two-wheel tractor of the type shown in my Patent No. 2,189,072 dated February 6, 1940, or No. 2,223,375, dated December 3, 1940.

Such a tractor comprises an engine and a transmission mechanism rearwardly thereof, and a frame which comprises engine supporting members and a transmission housing; the single pair of wheels supporting said housing. This disposes the engine in forwardly projecting relation to the wheels and overhanging relation to the ground—a feature which is made use of as an aid to balancing the weight of the two-wheel implement or trailer behind and relieving the swivel connecting elements of undue binding strains.

The present invention deals particularly with the frame of the tractor; the main object being to construct the engine supporting members as a continuous fuel holding tank. By means of this arrangement, several advantages are gained.

For one thing, a very large amount of fuel may be carried without the need of separate tanks and without increasing the actual size of the tractor, either as to length or width. For another thing, the extra weight thus added to the overhanging portion of the tractor without the use of an excessive amount of metal, adds to the desired balancing action exerted by the tractor, and of course to the traction obtained at the single pair of wheels as well. Also, the strength of the frame members as thus formed is very great with a minimum of weight, and no additional trussing or bracing of the members to support the load of a heavy engine without deflection, is required.

These objects I accomplish by means of such structure and relative arrangement of parts as will fully appear by a perusal of the following specification and claims.

In the drawings similar characters of reference indicate corresponding parts in the several views:

Figure 2 is a side elevation, partly in section, of the tractor frame detached.

Figure 3 is a cross section on line 3—3 of Fig. 2.

Figure 4 is a top plan view of the frame.

Figure 1:
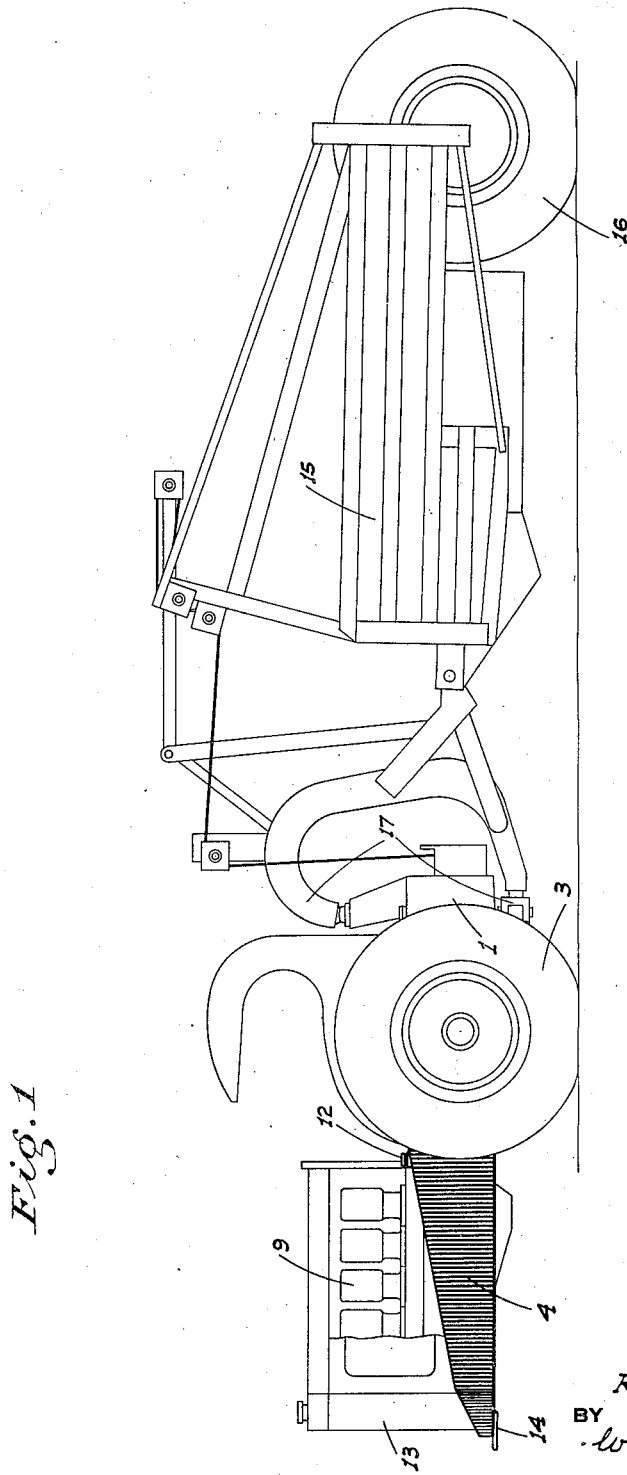
Figure 1 is a side outline of a tractor and implement unit, showing the tractor equipped with my improved engine supporting frame members.

Referring now more particularly to the characters of reference on the drawings, I denotes the main member of the transmission housing of the tractor, having opposed openings 2 through which the axles of the supporting wheels 3 project for connection with the driving mechanism within the housing as is customary.

The engine supporting members of the frame, which embody the invention, comprise a pair of longitudinal beams 4. These are of hollow rectangular form in cross section, and are preferably horizontal along their lower edge, but slope down from back to front along their upper edge as shown.

The beams at their back end are straight and abut against and are welded to corresponding straight or flat face transverse walls 5 formed on the housing 1 at the sides and adjacent its forward end.

For substantially their entire length, the beams are increased laterally inward in width from the bottom up a certain distance as at 6. This increase in width not only increases the fuel carrying capacity of the beams and serves to stiffen the same against horizontal deflection, but forms upwardly facing ledges 7 along the inner side of the beams which are parallel to the lower edge of the beams. These ledges serve to support the mounting pads 8 for the supporting lugs which project laterally as usual from the base block of the engine 9 which is of standard make.

At their forward end, the beams are connected by a hollow cross beam 10, the bottom of which is level with the bottom of beams 4 and which has free communication with the interior of said beams through openings 11. The interior area of the beams forms a continuous completely enclosed tank, capable of containing a large supply of fuel, access to the tank being had through a filling opening and cap unit 12 disposed at the high end of one of the beams 4.

This cross beam also serves to support the radiator 13 for the engine, as well as a coupling eye 14.

As illustrating one form of unit of which such a tractor forms an essential part, I have shown in Fig. 1 a scraper 15 mounted on rear wheels 16 and supported at its forward end in connection with the housing 1 of the tractor by a connection unit 17 which allows of swivel movement of the tractor relative to the scraper in a horizontal plane only, and which preferably embodies the features of construction shown in my Patent No. 2,223,375.

The overhanging weight ahead of the tractor wheels provided by the engine supplemented by the fuel in the beam tanks, serves to hold the front end of the relatively short tractor down and substantially balances the forward portion of the longer scraper body, thus relieving the vertically spaced coupling elements of the connection unit 17 from excessive binding strains. Traction at the wheels 3 is of course also increased.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tractor frame comprising a housing for transmission mechanism, and transversely spaced engine supporting side beams secured on and projecting forwardly from the housing; said beams being hollow and closed, forming fuel retaining areas, and widened in a laterally inward direction from the bottom upward for a certain distance to provide longitudinal ledges along the top of the widened portion for the support of the base of the engine of the tractor.

2. A tractor frame comprising a rigid frame part, and transversely spaced engine supporting beams secured on and projecting forwardly from said frame part; one of said beams being hollow and closed, forming a fuel tank, and said beams being widened in a laterally inward direction below their upper edges to form rigid upwardly facing ledges to support the engine of the tractor.

3. A structure as in claim 2 in which the lower edges of said beams are straight and normally substantially horizontal, said engine supporting ledges being disposed in a plane parallel to said edges.

4. In a tractor, a frame part, transversely spaced side beams projecting substantially horizontal from said frame part, the beams being hollow and closed to form fuel tanks, an engine disposed between said side beams, and means on the beams some distance below their upper edges projecting laterally inward and supporting the engine, there being a hollow cross beam connecting said side beams at their forward end and in communicating relation; the top of said cross beam being in a horizontal plane below the horizontal plane of said engine supporting means.

5. In the combination of a two-wheel tractor which includes a frame having a housing intermediate the wheels enclosing drive mechanism with which said wheels are connected and a frame supported engine connected with said mechanism and projecting forwardly from said housing, and a trailing implement having a forwardly extending hitch unit mounted in vertically rigid connection with the tractor frame so as to maintain said engine in overhanging relation to the ground; means included in said frame ahead of the axis of said wheels arranged to increase the traction of the latter, said means comprising a pair of transversely spaced beams of substantial average cross sectional area projecting forwardly from said housing on opposite sides of the engine in overhanging relation to the ground and unsupported at their outer ends, said beams being elongated and hollow, forming fuel retaining tanks.

ROBERT G. LE TOURNEAU.